US012541199B2

(12) United States Patent
Martin et al.

(10) Patent No.: US 12,541,199 B2
(45) Date of Patent: Feb. 3, 2026

(54) AUTONOMOUS OPERATING ZONE SETUP FOR A WORKING VEHICLE OR OTHER WORKING MACHINE

(71) Applicant: Kubota Corporation, Osaka (JP)

(72) Inventors: Kyle A. Martin, Fort Worth, TX (US); Jeremy Adams, Fort Worth, TX (US)

(73) Assignee: KUBOTA CORPORATION, Osaka (JP)

( * ) Notice: Subject to any disclaimer, the term of this patent is extended or adjusted under 35 U.S.C. 154(b) by 212 days.

(21) Appl. No.: 18/366,331

(22) Filed: Aug. 7, 2023

(65) Prior Publication Data

US 2024/0061423 A1    Feb. 22, 2024

Related U.S. Application Data

(60) Provisional application No. 63/398,308, filed on Aug. 16, 2022.

(51) Int. Cl.
G05D 1/00    (2024.01)

(52) U.S. Cl.
CPC ......... G05D 1/0044 (2013.01); G05D 1/0016 (2013.01); G05D 1/0212 (2013.01)

(58) Field of Classification Search
CPC ... G05D 1/0044; G05D 1/0016; G05D 1/0212
See application file for complete search history.

(56) References Cited

U.S. PATENT DOCUMENTS

| 11,145,007 | B2 | 10/2021 | Ruff et al. |
| 12,256,665 | B1* | 3/2025 | Liu ................. A01D 69/02 |
| 2015/0220086 | A1* | 8/2015 | Willgert .......... A01D 34/008 |
| | | | 701/26 |
| 2015/0296707 | A1* | 10/2015 | Fukuda ............ A01D 34/64 |
| | | | 701/25 |

(Continued)

FOREIGN PATENT DOCUMENTS

| EP | 4256920 A1 | 10/2023 |
| JP | 2022-85681 A | 6/2022 |

(Continued)

OTHER PUBLICATIONS

Japan Patent Office; International Search Report and Written Opinion; PCT App. No. PCT/JP2023/029479; Filed: Aug. 14, 2023; Dated: Oct. 31, 2023; pp. 1-9.

(Continued)

*Primary Examiner* — Naeem Taslim Alam
(74) *Attorney, Agent, or Firm* — Schwabe Williamson & Wyatt

(57) ABSTRACT

Some embodiments may include a touchscreen or other user input interface to select part of a displayed map and one or more processors coupled to the touchscreen or other user input interface. The one or more processors may be configured to setup an autonomous operating zone for a working machine based on a user selection from a displayed map. The working machine may monitor its current location with respect to the autonomous operation zone, and may de-actuate at least one of its actuator(s) or send a new actuation (Continued)

signal to its actuator(s) to change an operation of at least one motorized device of the working machine. Other embodiments may be disclosed and/or claimed.

17 Claims, 13 Drawing Sheets

(56) References Cited

U.S. PATENT DOCUMENTS

| | | | |
|---|---|---|---|
| 2019/0216014 A1* | 7/2019 | Hahn | A01D 34/54 |
| 2019/0357431 A1* | 11/2019 | Kamfors | A01D 34/008 |
| 2020/0020093 A1* | 1/2020 | Frei | G05D 1/101 |
| 2020/0050208 A1* | 2/2020 | Frick | G06V 20/64 |
| 2021/0027489 A1 | 1/2021 | Shimamura et al. | |
| 2021/0168996 A1* | 6/2021 | Lee | G05D 1/0278 |
| 2021/0378172 A1* | 12/2021 | Ackerman | G05D 1/028 |
| 2022/0039313 A1* | 2/2022 | Morrison | G05D 1/0223 |
| 2022/0217902 A1* | 7/2022 | Chen | G06V 20/58 |
| 2023/0042867 A1* | 2/2023 | Degnan | A01D 34/863 |
| 2023/0109631 A1* | 4/2023 | Takahashi | G06Q 50/02 705/7.26 |
| 2023/0114806 A1* | 4/2023 | Nishii | G05D 1/0044 701/50 |
| 2023/0259138 A1* | 8/2023 | Chen | G06V 10/80 700/245 |
| 2024/0032525 A1* | 2/2024 | Petro | G06V 20/56 |

FOREIGN PATENT DOCUMENTS

| | | |
|---|---|---|
| JP | 2022-87959 A | 6/2022 |
| WO | 2019/180950 A1 | 9/2019 |
| WO | 2022/118573 A1 | 6/2022 |
| WO | 2022118568 A1 | 6/2022 |

OTHER PUBLICATIONS

European Patent Office; Supplementary European Search Report; EP App. No. 23854886; Dated: Dec. 4, 2025; pp. 1-9.

* cited by examiner

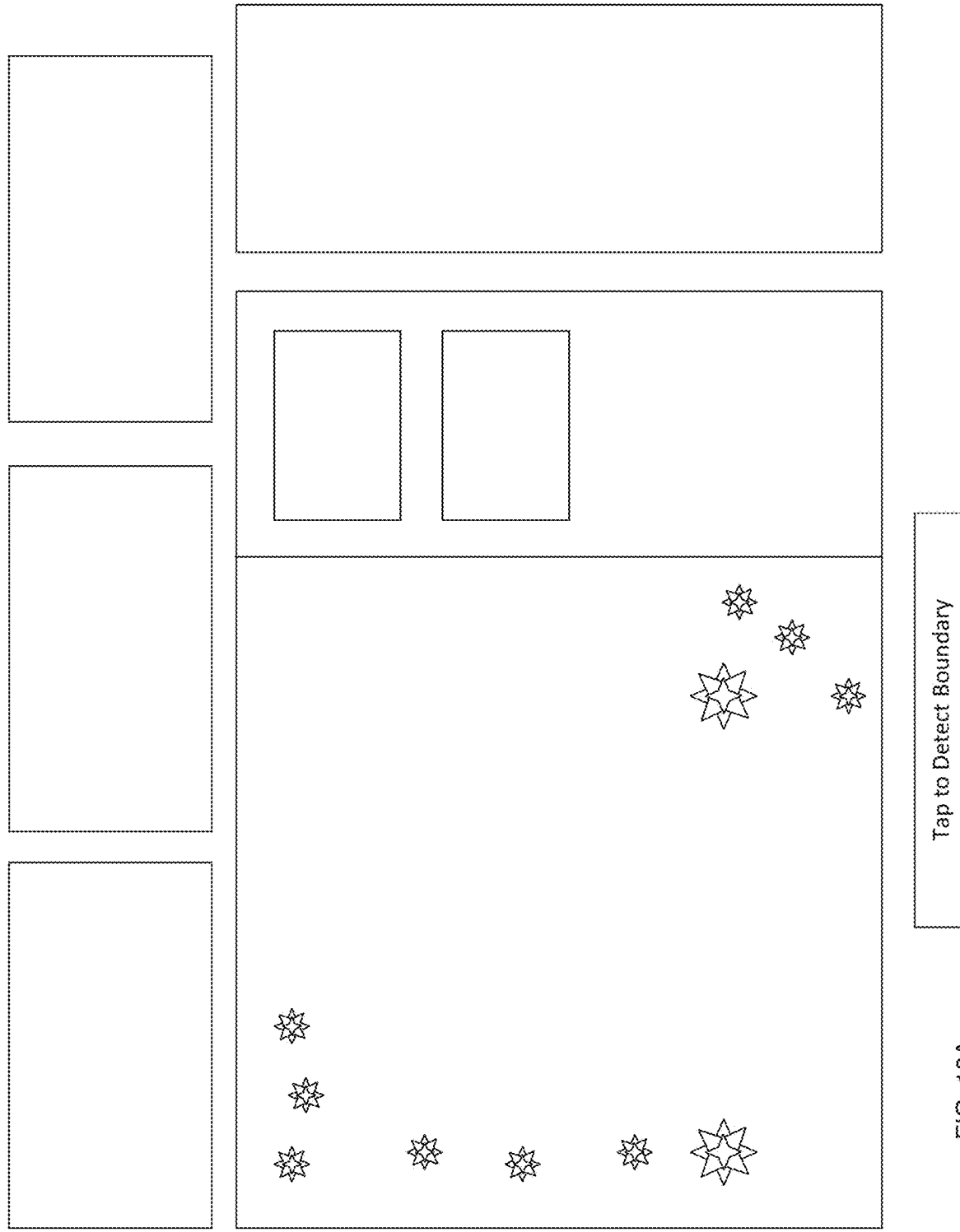

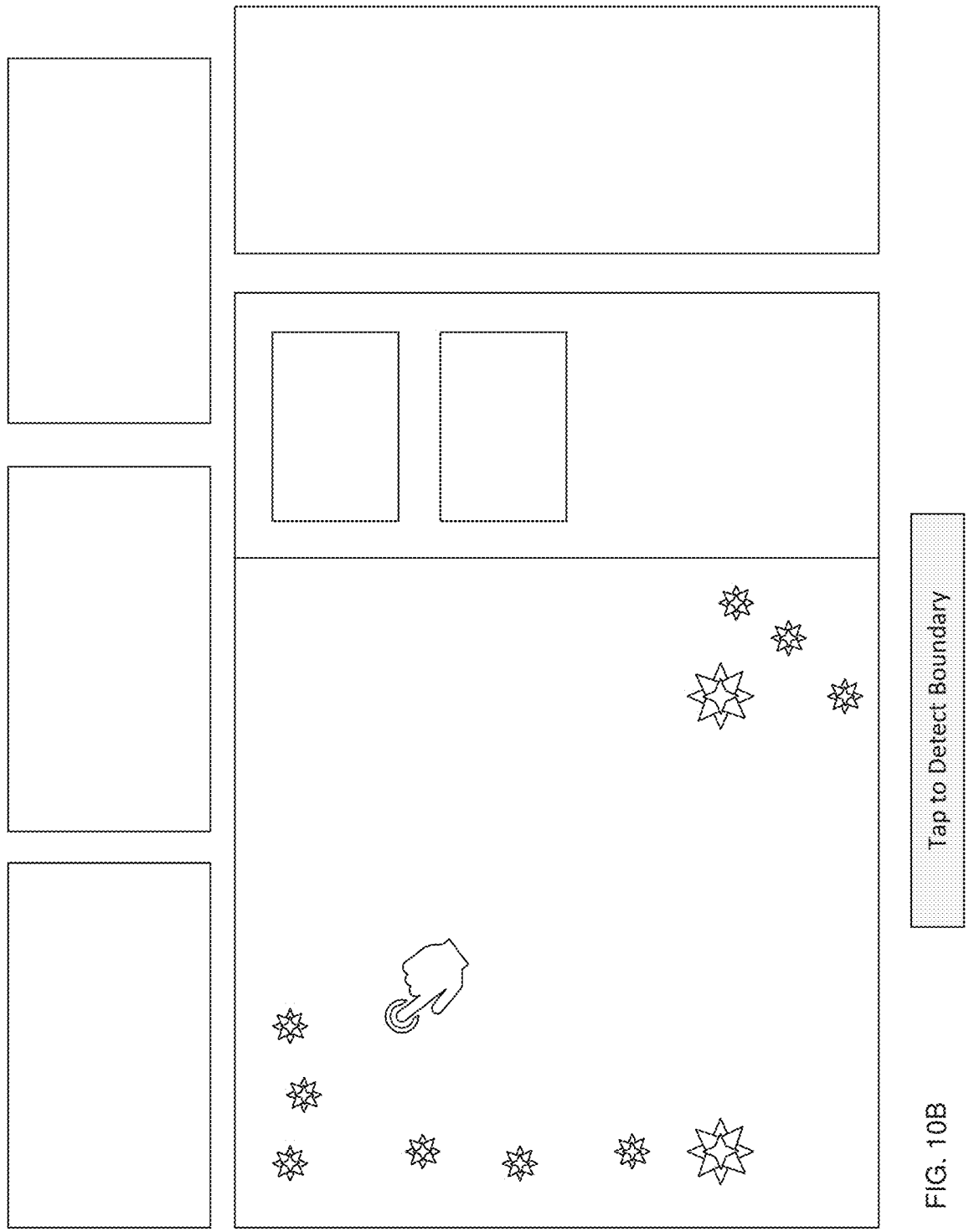

AUTONOMOUS OPERATING ZONE SETUP FOR A WORKING VEHICLE OR OTHER WORKING MACHINE

PRIORITY

This application is a non-provisional of U.S. Provisional Application No. 63/398,308 filed on Aug. 16, 2022, which is incorporated by reference herein.

TECHNICAL FIELD

The present disclosure relates to off-highway working vehicles and other working machines, and some embodiments relate to setting up autonomous operating zones the off-highway working vehicles or other working machines.

BACKGROUND

Off-highway working vehicles or other working machines, which may operate on steep or uneven ground, may include utility vehicles, such as tractors, lawnmowers, construction vehicles, agriculture vehicles, or the like. These working machines may have transportation systems, such as wheels, treads, walking devices, crawlers, or the like, to transport the working machine from one location to another. A motorized transportation system may be powered by any power source, such as a combustion engine, an electric motor, or the like, or combinations thereof.

In addition to the transportation system, these working machines may include tools for performing a work task, such as a residential operation, commercial operation, or industrial operation. Example work tasks may include mowing, spraying, harvesting, planting, digging, mining, leveling, or the like. These tools may also be referred to as implements, and may include:

Passive implements such as a plow that is pulled by a tractor, a trailer with a non-motorized transportation system, or the like; and Motorized implements, such as a powered hitch to position a plow, a mower, a digger, a lawn edger, or the like.

Various components of these working machines (e.g., motorized devices of the transportation system and/or a motorized implement), may be configured to operate autonomously (e.g., fully autonomously or semi-autonomously). A robotic lawn mower is one example of a working machine that may operate fully autonomously. A tractor having an auto-steering system interfacing with the steering wheel (or steering wheel column) is one example of a semi-autonomous working vehicle (because an operator may manually steer the vehicle using the steering wheel).

BRIEF DESCRIPTION OF THE DRAWINGS

FIGS. 10A, 10B, and 10C each schematically illustrate a different state of an example visualizations that may be displayed by any compute device processor described herein to perform the process described with reference to FIG. 9, according to various embodiments.

DETAILED DESCRIPTION

Figure 1:
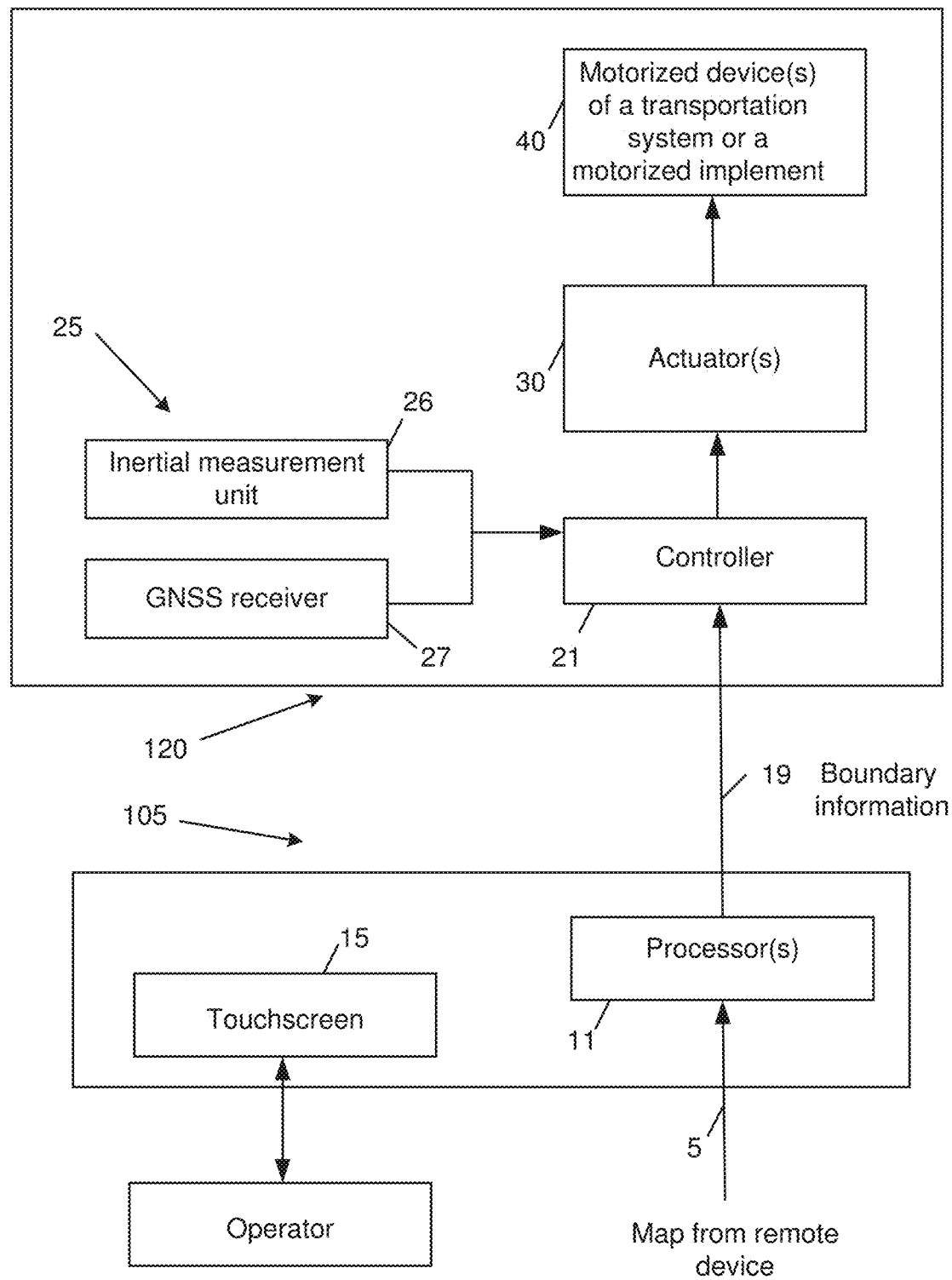
FIG. 1 illustrates a schematic diagram of a system including a working machine and one or more computing devices to setup an autonomous operating zone for the working machine, according to various embodiments.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Some autonomous systems use physical boundaries to constrain operation of a working machine. In these systems, an operator may set the physical boundaries by deploying markers, or other physical devices, around a field, property, or other area. However, the time spent by the operator deploying and maintaining the deployed markers or other physical devices is costly, not to mention the cost of the markers or other physical devices themselves.

Various embodiments described herein allow logical setup of an autonomous operating zone via one or more separate compute devices, or a user interface integrated with the working machine. The logical setup may generate boundary information, which may then be transmitted to the working machine. The transmitted boundary information may include one or more virtual boundaries recognizable by the working machine, or the working machine may derive one or more virtual boundaries from the transmitted boundary information. Accordingly, a logically-defined autonomous operating zone for the working machine may be quickly setup.

This logically-defined autonomous operating zone may be used to control operations of one or more motorized devices of a transportation system or implement(s) of the working machine. For example, a robotic lawnmower may be arranged to power down its transportation system and/or its mowing implement when its current location is non-coinciding with the logically-defined autonomous operating zone, e.g., if the robotic lawnmower comes within a threshold distance, or crosses in some embodiments, a perimeter of the logically-defined autonomous operating zone. In another example, a tractor or other working vehicle may use the logically-defined autonomous operating zone to determine a path to be followed by an auto-steering system for a work task (such as to plan passes in a field to provide full field coverage, which may ensure that the entire field is sprayed, planted, harvested, etc.). These are only some examples of how a working vehicle or other working machine may utilize a boundary for controlling autonomous operations of its components.

Also, autonomous passenger vehicles (e.g., on-highway vehicles) may have systems that are optimized for ease of entry of a user-defined destination before initiation of a trip. For example, there are many systems that simplify the process for an operator to select from past destinations, or to confirm a destination from a connected device. It would be desirable for working vehicles to have similarly simplified user interfaces for an operator to set an autonomous operating zone, before initiation of work tasks.

In some embodiments, a working machine or one or more separate compute devices coupled thereto may present a boundary suggestion on a selected part of a map. The boundary suggestion and/or selected part of the map may be determined based on a user selection, or any other input that indicates an area of operation for a working machine to operate.

It may be possible and practical to utilize a physically and logically-defined autonomous operating zone. For example, one perimeter segment could be defined by deployment of markers or other physical devices, and another perimeter segment could be defined by one or more virtual boundaries. In various embodiments, an outer perimeter could be defined by deployment of markers or other physical devices and an inner perimeter (such as, in a robot mowing embodiment, for areas without lawn coverage, e.g., bark dust, trees, patios, gardens, etc.)

FIG. 1 illustrates a system 100 including a working machine 120 and one or more compute devices 105 to setup an autonomous operating zone for the working machine 120, according to various embodiments. The autonomous operating zone may be defined by one or more virtual boundaries of a field, property, or other physical area. The one or more compute devices 105 may transmit boundary information 19, which may include the one or more virtual boundaries, or may include untranslated data from which the working machine may derive the one or more virtual boundaries.

The working machine 120 may include one or more motorized devices 40, which may be components of a motorized transportation system or the working machine and/or a motorized implement of the working machine. Actuator(s) 30 may drive movement of the motorized devices 40, under control of a controller 21. These motorized device(s) 40 and actuator(s) 30 may include any motorized devices of motorized transportation systems or motorized implements, now known or later developed.

The controller 21 may include a set of one or more processors, which may be implemented using any circuitry now known or later developed. Examples of circuitry that may be used to implement the set of one or more processors may include logic, application-specific processors, general purpose processors to execute instructions stored in a memory, or the like, or combinations thereof.

In some embodiments, the actuators 30 may be part of an auto-steering system similar to the auto-steering system described in U.S. Pat. No. 10,822,017 (which is herein incorporated by reference herein), or any other auto-steering system now known or later developed. In some embodiments, the set of one or more processors of the controller 21 may perform any functions of any precision guidance system (PGS) described in U.S. Pat. No. 10,986,767 (which is incorporated by reference herein), such as any of the steering controller functions and/or the processor functions described in that US patent.

The working machine 120 may include a location determining system for determining a current location of the working machine 120. In the illustrated embodiment, the location determining system may include sensors such as inertial measurement unit 26 and a Global Navigation Satellite System (GNSS) receiver 27, but in other embodiments a location determining system may include any other local or remote sensor, or other device, now known or later developed, for collecting raw information from which a current location of the working machine 120 may be derived. The controller 21 may determine a current location of the working machine 120 using any location determining algorithms, now known or later developed.

The one or more compute devices 105 may include a smartphone carried by the operator, or some other mobile or stationary compute device, now known or later developed. In some embodiments, the one or more compute devices 105 may also include cloud devices, a server, or some other remote resource that may assist the mobile or stationary compute device in generating the transmitted information 19. A mobile or stationary compute device may upload information to the server/cloud (e.g., over a long range wireless connection, in the case of a mobile device) to have remote computations provided, with the resulting information passed back to the mobile or stationary compute device (for further processing and/or downloading to the working machine 120), or downloaded directly from the server/cloud to the working machine 120 (e.g., the cloud/server may download the transmitted information 19 directly to the working machine 120).

In the illustrated embodiment, one or more separate compute devices 105 are provided to generate boundary information 19, which may include the one or more virtual boundaries or may include untranslated data from which the one or more virtual boundaries may be derived. The one or more separate compute devices 105 may be coupled to the working machine by a wired connection or wireless connection, or alternatively may download information to a memory card or other memory readable by the working machine 40. The one or more compute devices 105 may include one or more processors 11 and a touchscreen 15 or other user input interface by which an operator may make selections from content displayed by the one or more compute devices 105.

Although one or more separate compute devices are described in the illustrated embodiment, some embodiments may not require any separate compute device. In these embodiments, the touchscreen or other input device 15 may be integrated into the working machine. In such an example, any compute device operations described herein may be performed by a processor of a set of one or more processors of the working machine 120. In these embodiments, a working machine may include a plurality of processors, one of which may control the actuator(s) 30 and another of which may perform any compute device operations described herein.

Referring again to the illustrated embodiment, one or more compute device processors 11 may obtain at least one location information value. In some examples, the at least one location information value may be an address of a target property that the operator specifies (e.g., a property at which the one or more working tasks will be performed). In other examples, the at least one location information value may be a detected location associated with the working machine 120, such as a current location determined by the location determination system, or a detected location of a local compute device of the one or more compute devices 105 (especially if the local compute device is coupled to the working machine 120 via a wired connection or a short range wireless connection). The at least one location information value may be an operator input, or may be received from the working machine or some other device coupled to the one or more computing devices 105 (e.g., an additional working machine which may located nearby, or some other nearby resource).

Using the at least one location information value, the one or more compute device processors 11 may obtain a map 5. The map 5 may be obtained from a remote platform, such as a web mapping platform (where a map can be obtained by specifying a property or a GPS location). The obtained map 5 may be a map produced by aerial images (e.g., images captured using a drone, an aerial vehicle, a satellite, or the like, or combinations thereof), a terrain map, a traffic map, or the like, or combinations thereof. In various embodiments, the map 5 may contain high-resolution, map quality images, such as the images of an orthomosaic map which may be provided by web mapping platforms. In other embodiments, an operator or a server may input any map described herein to the one or more compute devices 105.

The one or more compute devices 105 may present information based on the map 5 on the touchscreen 15 or other display device associated with the one or more compute devices 105 to obtain a selection from the operator, to setup the autonomous operating zone for the working machine 120. In some embodiments, the displayed information may include a graphical user interface that may allow a user to graphically denote a user selection from the map 5. In one example, the operator may add graphical markings via the graphical user interface using the touchscreen 15 or some other input device of a user input interface of the one or more compute devices 105 to denote a selected boundary.

The user selection on the presented map may specify perimeter information for defining an enclosed area in which the working machine 120 will autonomously perform the working tasks. In other embodiments, the perimeter information may include one or more perimeter segments, rather than defining a completely enclosed area. In any case, the perimeter information may exclude sub-areas within the area, such as areas without lawn coverage, e.g., bark dust, trees, patios, gardens, etc.

The one or more compute devices 105 may translate the operator's selection from the map to coordinate information that can be interpreted by the controller 21 to identify one or more virtual boundaries. In these examples, the transmitted information 19 may include the coordinate information. In other embodiments, the translation may be performed by the controller 21 (e.g., the controller 21 may derive the coordinate information from the transmitted boundary information 19).

Figure 2:
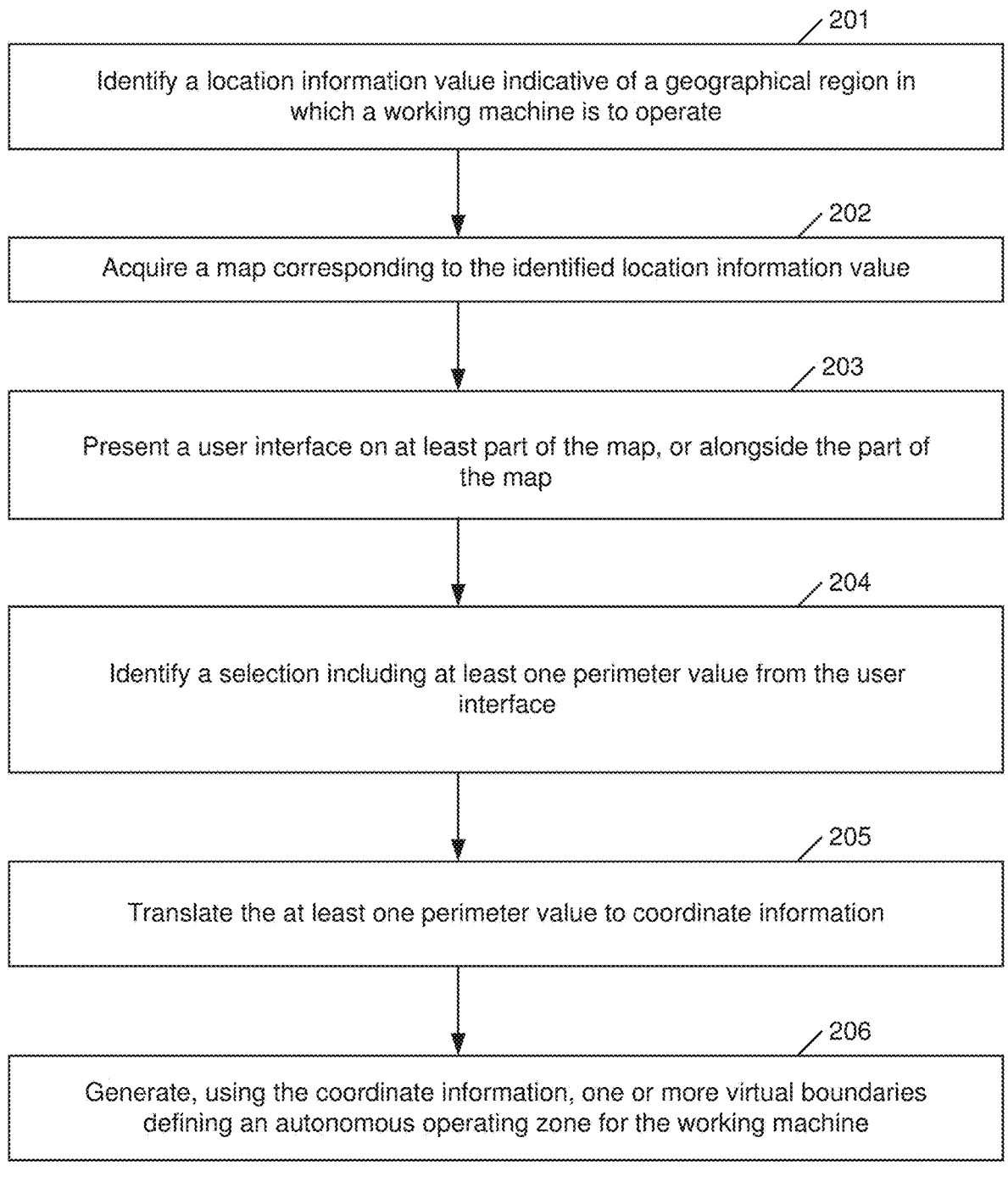
FIG. 2 illustrates operations that may be performed by the system of FIG. 1 to generate one or more virtual boundaries of the autonomous operating zone.

FIG. 2 illustrates operations 200 that may be performed by the system 100 of FIG. 1 to generate one or more virtual boundaries of the autonomous operating zone. In block 201, the system 100 may identify a location information value indicative of a geographic region in which a working machine is to operate. The location information value may be an address, a location detected using a location determination system, or the like, or combinations thereof. In some embodiments, the user interface may be arranged to provide a hint based on the current or past locations of the vehicle (the hint may prioritize current or past locations in a user selection list).

In block 202, the system 100 may acquire a map corresponding to the identified location information value. In block 203, the system 100 may present a user interface on at least part of the map, or alongside the part of the map.

In some embodiments, the system 100 may detect a suggested boundary and include the suggested boundary on the presented user interface. However, this is not required. In embodiments in which a suggested boundary is provided, the system 100 may detect the boundary using pixel analysis, by accessing records (such as property line records), or the like, or combinations thereof. The user interface may include interface elements for a user to accept or modify the suggested boundary.

In block 204, the system 100 may identify a selection including at least one perimeter value from the user interface. In block 205, the system 100 may translate the at least one perimeter value to coordinate information. In block 206, the system 100 may generate, using the coordinate information, one or more virtual boundaries defining an autonomous operating zone for the working machine.

Figure 3:
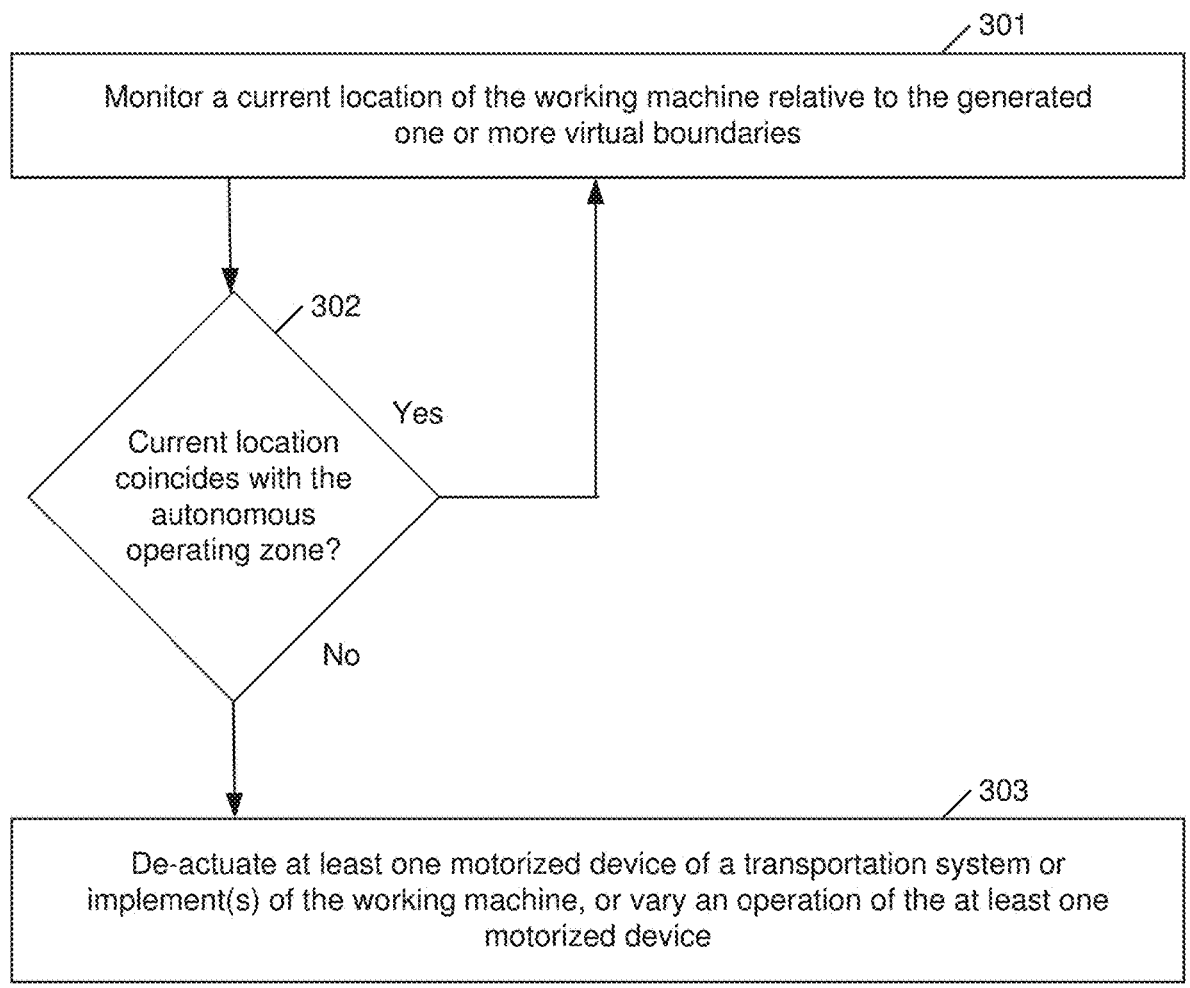
FIG. 3 illustrates operations that may be performed by the working machine of FIG. 1 using the generated one or more virtual boundaries.

FIG. 3 illustrates operations 300 that may be performed by the working machine 120 of FIG. 1 using the generated one or more virtual boundaries. In block 301, the working machine 120 may monitor a current location of the working machine relative to the generated one or more virtual boundaries.

If the working machine 120 determines that the current location does not coincide with the autonomous operating zone in diamond 302, then in block 303 the working machine 120 may de-actuate at least one motorized device 40 of a transportation system or implement(s) of the working machine 120, or vary an operation of the at least one motorized device 40. Otherwise, the working machine may continue monitoring a next current location in block 301.

Figure 4:
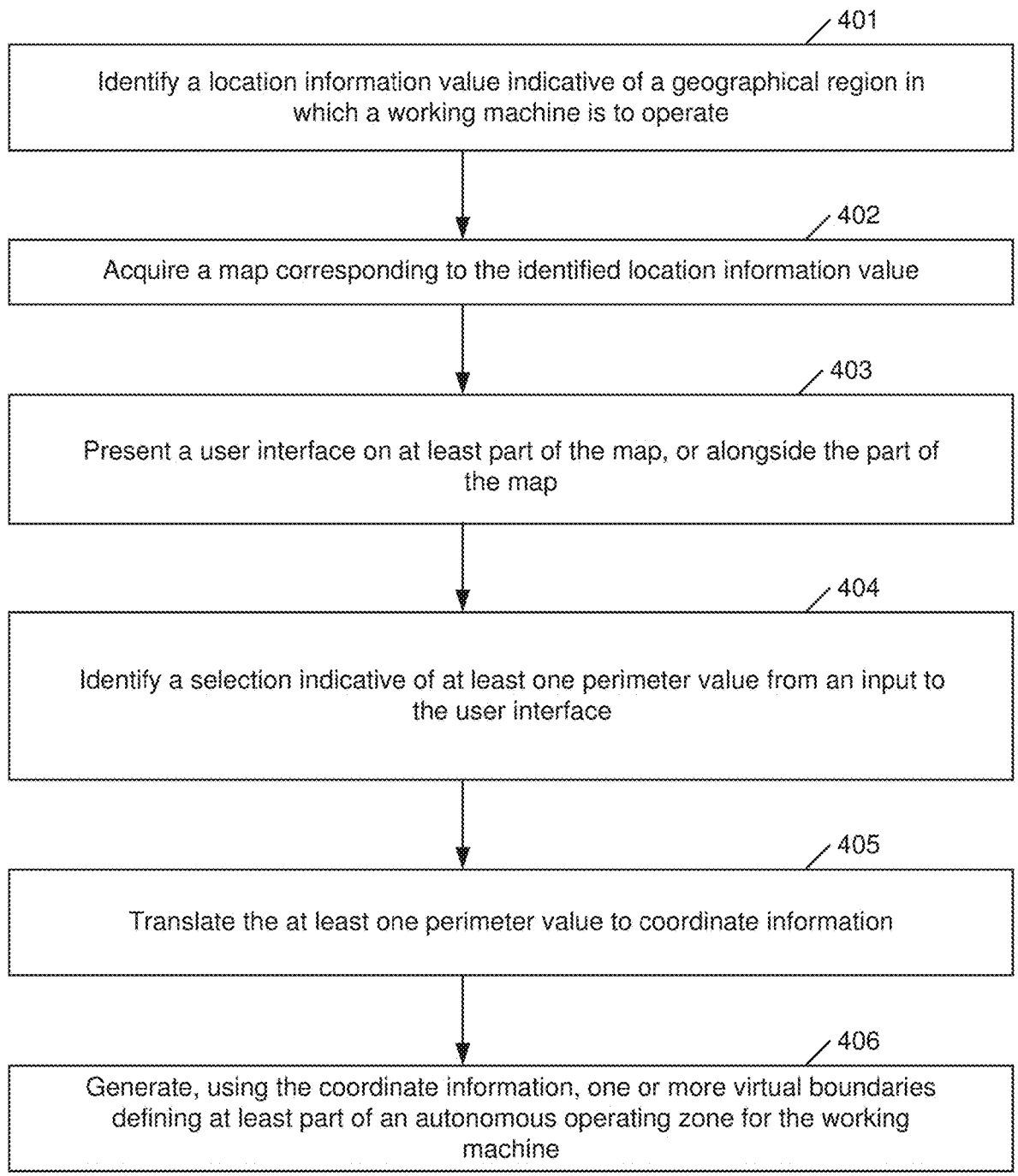
FIG. 4 illustrates a method that may be performed using any system described herein to generate a boundary suggestion, according to various embodiments.

FIG. 4 illustrates a method 400 that may be performed using any system described herein to generate a boundary suggestion, according to various embodiments. In block 401, a location information value indicative of a geographic region in which the working machine is to operate may be identified. In block 402, a map corresponding to the identified location information value may be acquired.

In block 403, a user interface may be presented on at least part of the map, or alongside the part of the map. In block 404, a selection indicative of at least one perimeter value may be identified from an input to the user interface.

In block 405, the at least one perimeter may be translated to coordinate information, or some other information for interpretation by a working machine. In block 406, one or more virtual boundaries defining at least part of an autonomous operating zone for the working machine may be generated using the coordinate information. The working machine may perform any working machine operations based on the autonomous operating zone, such as the operations of FIG. 3.

In various embodiments, a user interface for defining an autonomous operating zone may allow a user to assign different different subzones with different restrictions, in various embodiments. These different subzones may be user-defined by manipulating aerial imagery. For example, one of the subzones may be a preferred transport area (e.g., a preferred driving area). In this subzone, a working machine may traver at a speed that is greater than a maximum speed of travel in the other subzone(s), but may not use an implement. In another subzone, the working machine may travel at a lower maximum speed and use the implement. A real-world application may be an autonomous lawn mower that drives on a pathway rather than driving across the lawn. Another real world example may be a lawn mower that uses its implement only on the lawn, and not when it is driving on the pathway.

In various embodiments, the autonomous operating zone is generated based on image analysis of overhead imagery (e.g., collected by an aerial device), exclusively. In other embodiments, the autonomous operating zone may be generated based on image analysis of overhead imagery in combination with on-site data (such as imagery collected using an on-site device, which may or may not be an aerial device). In other examples it may be practical and possible to collect on-site overhead imagery and other on-site imagery using an aerial drone.

Additional Embodiments

Figure 5:
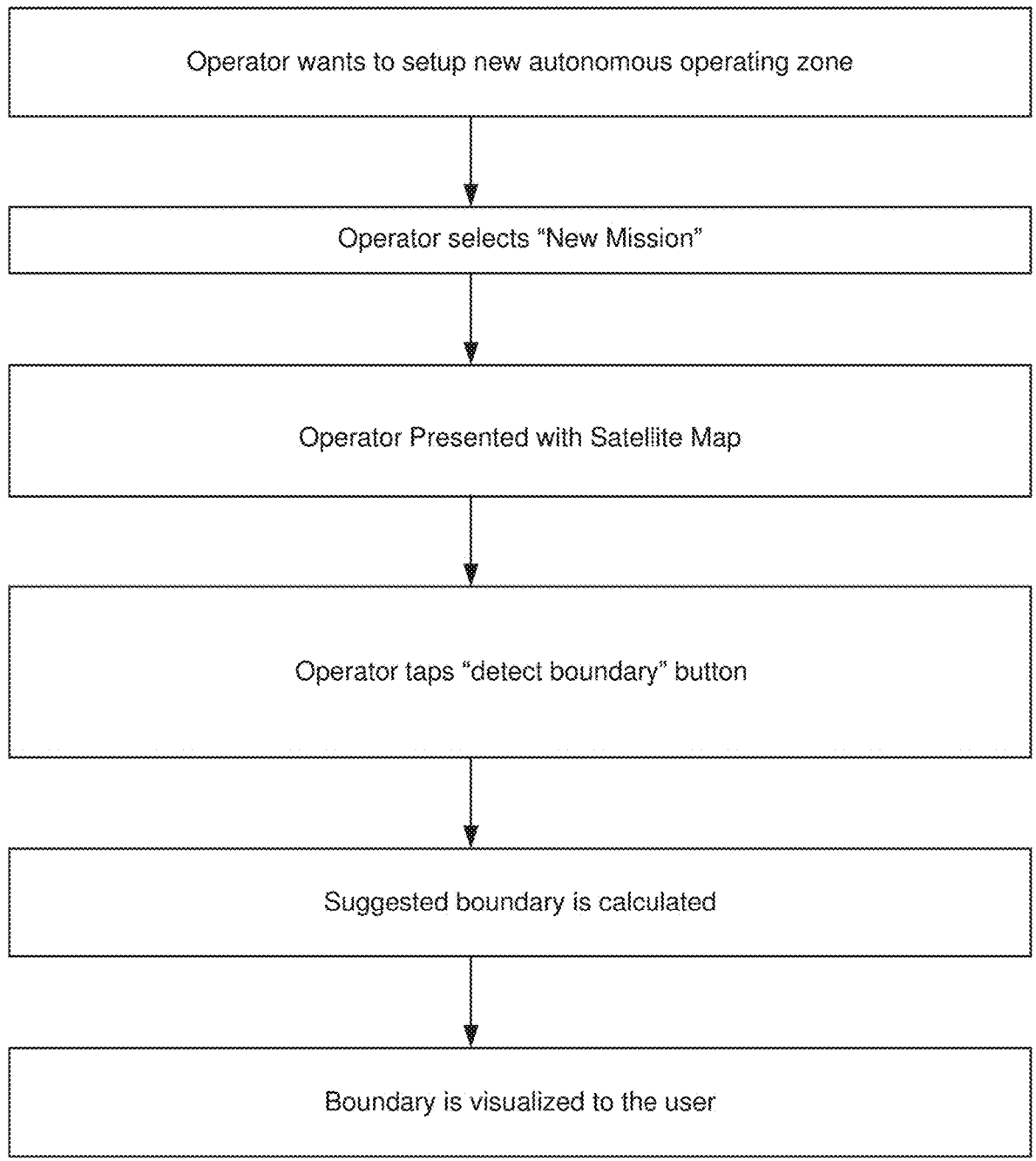
FIG. 5 illustrates compute device operations that may be performed to visualize a boundary to an operator, according to various embodiments.
Figure 6A:
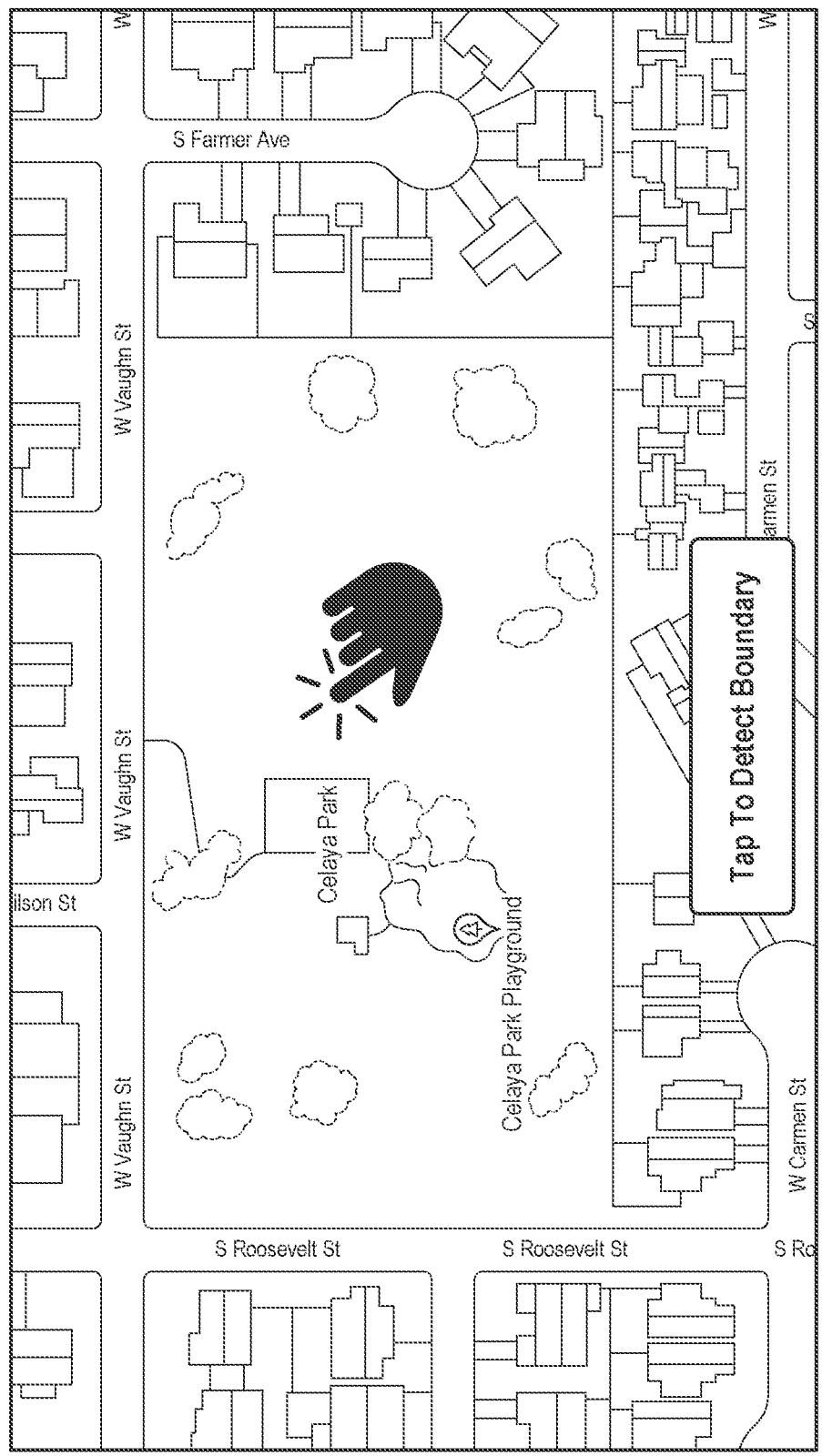
FIG. 6A illustrates a state of an example user interface that may be displayed by one or more compute device processors for tapping the detect boundary button in the method of FIG. 5.
Figure 6B:
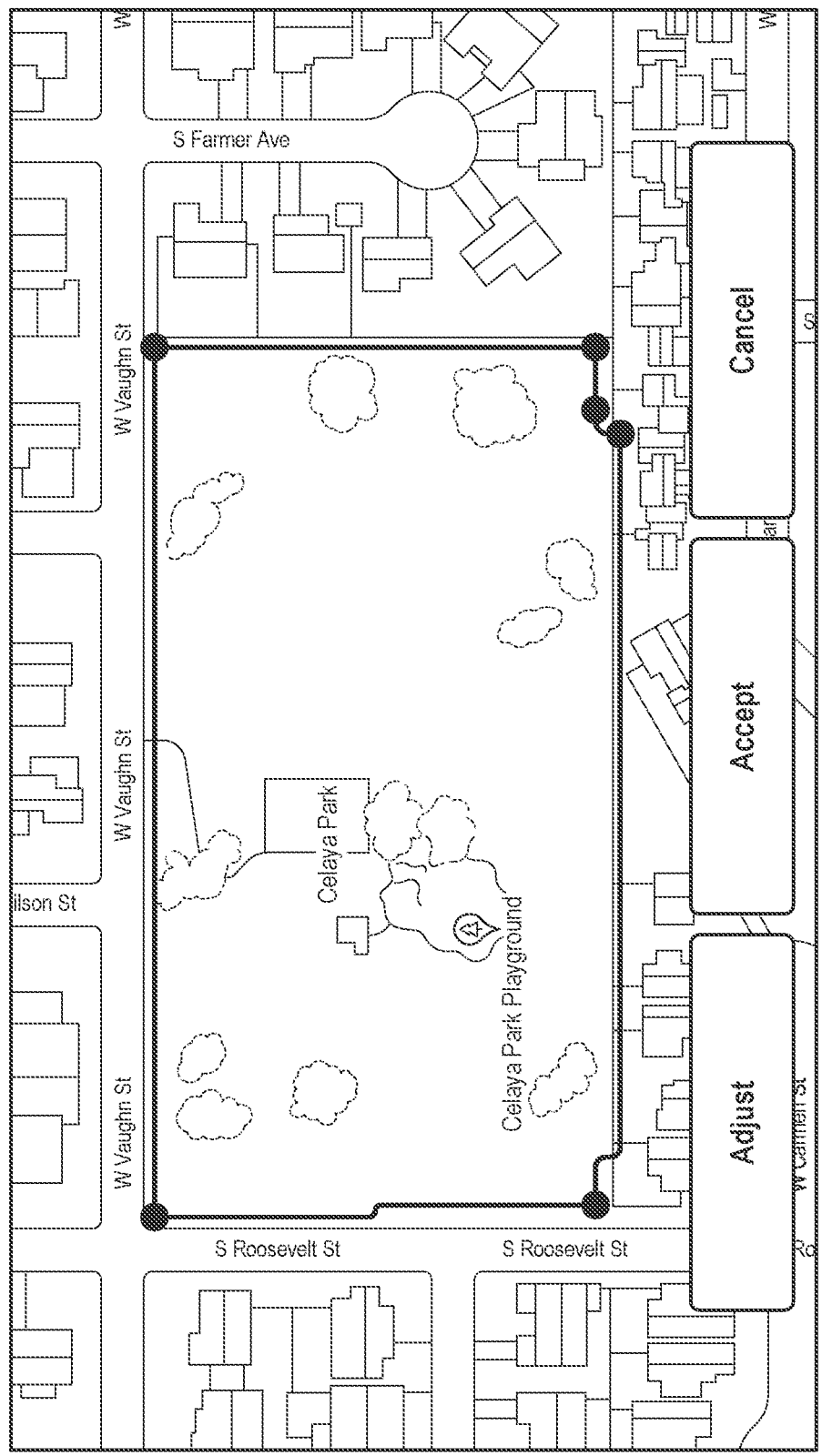
FIG. 6B illustrates a next state of the example user interface of FIG. 6A that may be displayed by the one or more compute device processors for visualizing a boundary to a user following activation of the detect boundary button.
Figure 7:
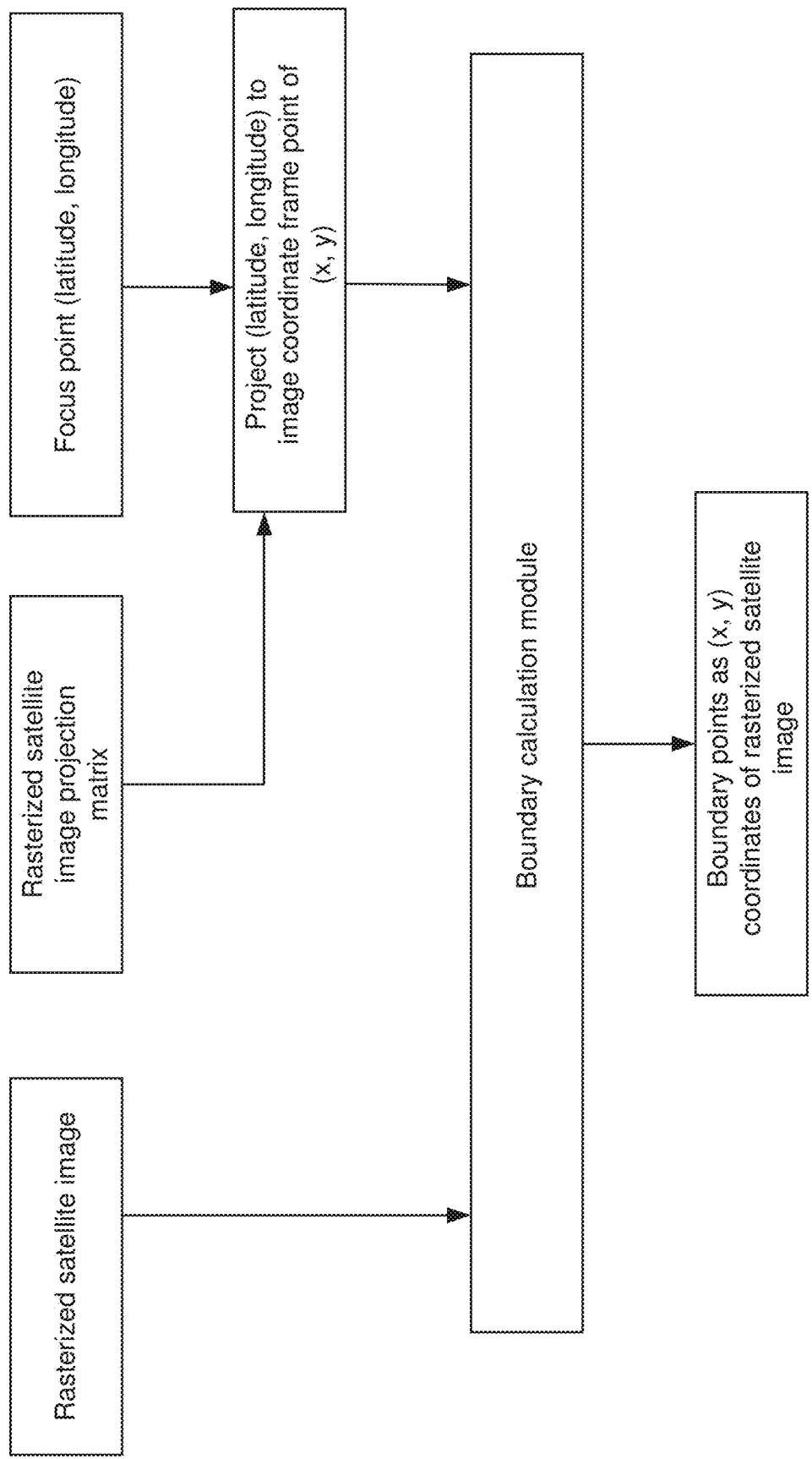
FIG. 7 illustrates a schematic diagram of a boundary calculation module to perform the boundary calculation of the compute device operations of FIG. 5.
Figure 8:
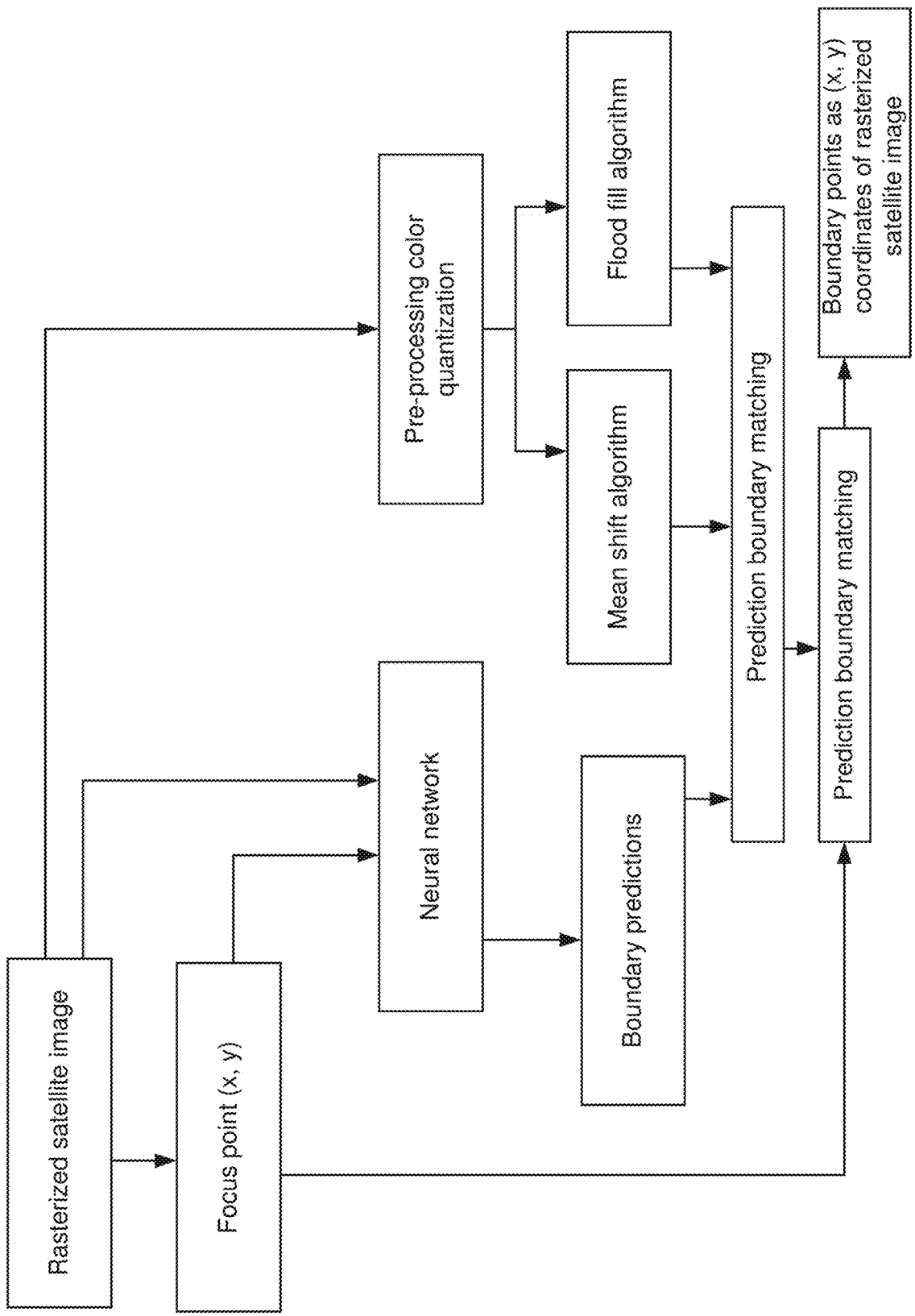
FIG. 8 illustrates a process that may be performed by the boundary calculation module of FIG. 7.

U.S. Provisional Application No. 63/398,308 filed on Aug. 16, 2022 describes embodiments that may be similar in various respects to the embodiments described herein. Any of the features described in the embodiments of the '308 may be combined with any of the features of the embodiments described herein. The content of the '308 application is incorporated by reference herein, but is also expressly repeated with respect to FIGS. 5-8. FIG. 5 illustrates compute device operations that may be performed to visualize a boundary to an operator, according to various embodiments. FIG. 6A illustrates a state of an example user interface that may be displayed by one or more compute device processors for tapping the detect boundary button in the method of FIG. 5. FIG. 6B illustrates a next state of the example user interface of FIG. 6A that may be displayed by the one or more compute device processors for visualizing a boundary to a user following activation of the detect boundary button. FIG. 7 illustrates compute device operations that may be performed to visualize a boundary to an operator, according to various embodiments. FIG. 8 illustrates a process that may be performed by the boundary calculation module of FIG. 7.

In vehicle/machine automation, a vehicle (or other machine) such as a drone, robot, or the like (e.g., a lawnmower, in some embodiments) may optionally use a boundary, such as a safety boundary or operational boundary. In these systems, an operator may define a bounded area based on Global Navigation Satellite System (GNSS) coordinates, such as GPS coordinates, in which the vehicle may operate normally.

When the operator does define an operating area, an on-board computing system of the vehicle may use a sensor (such as a GPS receiver) to continuously compare a current position of the vehicle to the defined operating area. If the on-board computing system detects that the vehicle leaves the defined operating area (e.g., based on the continuous comparison), the on-board computing system may generate a fault or other exception (e.g., the vehicle may request human assistance, may shut off, may power down selected components (such as the mower blade), or the like, or combinations thereof.

Some known user interfaces for selecting the GNNS coordinates may require specific knowledge about GNNS coordinates and/or may be time-intensive for the operator. What is needed is an improved user interface to define an operating area for a vehicle such as a drone, robot, or the like (e.g., a lawnmower, in some embodiments), without specific knowledge about GNNS coordinates and/or more quickly than using existing user interfaces.

Various embodiments may include one or more computing devices (e.g., the user's smartphone and/or a remote cloud/server) usable to perform the method illustrated in FIG. 5. A user interface may present a map based on aerial imagery (e.g., an orthomosaic map) to a user on a display. The map may be selected based on a user inputting location information (e.g., an address) into a system, or may be selected by detecting a location of the drone, robot, or the like.

The user may select a part of the map to operate the drone, robot, or the like. In one embodiment, this may be performed by tapping on a touch interface. With reference to FIGS. 6A-B, to operate the vehicle in the park, the user may tap the part of the map showing the park in an initial graphical user interface state, as shown FIG. 6A. The system may recognize a selection of the park, and auto-generate the illustrated boundary, and advance the graphical user interface to a next state, as shown in FIG. 6B.

The system may generate the illustrated boundary by using any boundary identification algorithm, now known or later developed. In one example, any processor described herein may include a boundary calculation module to perform a boundary identification algorithm. FIG. 7 illustrates an example boundary calculation module to perform the example boundary identification algorithm illustrated in FIG. 8.

In various embodiments, the module may access publicly available property line data, and may identify an edge of the park using the publicly available property line data. In other examples, the system may use a pixel analysis to identify a suggested boundary. This may provide an advantage to recognizing features that may not be indicated by the publicly available property line data. For example, where the vehicle is a lawnmower, the system may generate a boundary by identifying areas covered by lawn using image analysis. This may exclude areas without lawn coverage, e.g., bark dust, trees, patios, gardens, etc.

The illustrated boundary may be a suggested boundary, which the user may accept as proposed, or adjust the boundary for any reason. In one example, the user may intend to dedicate part of the property to a parking lot or jungle gym, which the user may want excluded from the operational zone for the lawnmower. In various embodiments, the suggested boundary may be adjustable by dragging, resizing, or the like.

Once the user has accepted the boundary, the system may generated GNSS coordinates from the accepted boundary. This may use any algorithm, now known or later developed, to translate locations on an image-based map (e.g., an orthomosaic map) to GNSS coordinates (such as GPS coordinates).

In various embodiments, the system may output coordinate information which the user may use to program the vehicle. In some embodiments, the system may transmit the coordinate information to the vehicle for automatically applying the operational boundary to the vehicle.

In various embodiments, the system may generate additional information (besides the operational boundary) that may assist the vehicle in operating within the operational boundary. For example, referring to the lawnmower to operate in the park, the pixel analysis may identify trees. Although the lawnmower has its own sensors to identify the trees while operating, the presence of the trees identified by the pixel analysis of the map may be fused with information generated by the lawnmower's sensors to navigate within the operational area. In various embodiments, optionally, any information generated by the pixel analysis may be fused with sensor vehicle generated by the vehicle to autonomously or semi-autonomously operate within the operational boundary.

Establishing Boundaries Using a Generalized Segmentation Model

In any embodiment described herein, the task of establishing boundaries may be performed using a generalized segmentation model (for example, the segment anything model). This model does not produce semantic meaning for each segment area produced. It only produces highly relevant object boundaries from a large training set.

Given an input of an overhead image and focus point, a Generalized Segmentation Model (for example Segment Anything Model) produces a set of segmentation boundaries at a pixel level. This model does not produce semantic meaning for each segment area produced. It only produces highly relevant object boundaries from a large training set. However, this autonomously generated initial data can then be enriched by generating and displaying one or more visualizations representative thereof, which a user can select from to enrich the autonomously generated initial data to produce subsequent data from which the autonomous operating zone may be setup.

Semantic or instance segmentation models may take a lot of training and labeling to identify just what we think the user may be interested in selecting for the map and can often fail. In contrast, a Generalized Segmentation Model may be used to autonomously produce data that the user may enrich by identifying areas of interest and provides more reliable and useful segmentation boundaries. The meaning of what has been segmented is assigned by the user whether it be an operating area, spray area, stop area, etc.

In some embodiments, a rasterized aerial image and focus point (x,y) (tapped to provide a center of the area of interest) are passed to a Generalized Segmentation Model. The output of that model is pixel-level segmentations for various areas which form a set of Boundary predictions. These predictions go through a secondary process of user selection where the user keeps selecting different boundaries (unless the boundary of interest is selected in a single one of the boundary predictions). This process could also be made by forming a box in the main image to surround the boundaries of interest and then selecting to exclude or include individual boundaries to be added to the final selection mask.

When the mask is ready and accepted by the user, a perimeter and associated polygon are produced for further refinement. The refinement is enabled via pick points to move, add, or subtract vertices to reshape the boundaries. When the final selection is complete, the boundary points of the final mask is saved.

This process can be completed multiples times for multiple types of areas desired for review. For example, a user may want a safety perimeter to mark the extents of a field. The user may also desire a speed zone around a row of trees which could be from a merged mask of trees using this method. Reference offsets could also be formed from detected boundaries for a "safety buffer".

It may also be possible to use 3D data captured from a drone with LiDAR or Structure From Motion (SFM) process. Assuming the 3D data has associated color data (e.g. RGB) the same Generalized Segmentation Model could establish boundaries and adjustments made with more detailed information such as the tree trunk location instead of the tree canopy which is seen only from overhead imagery.

Figure 9:
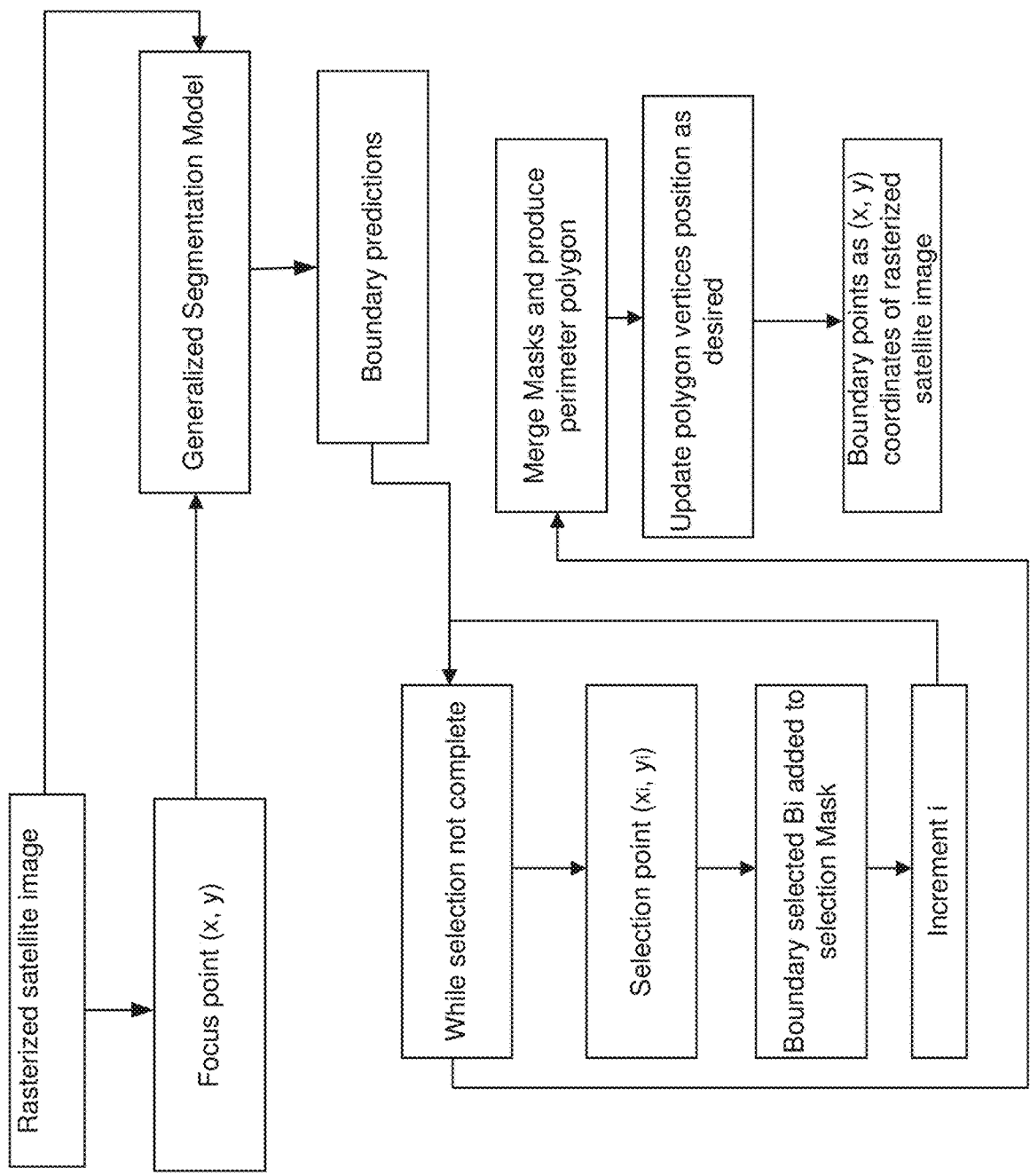
FIG. 9 illustrates a process that may be performed by any boundary calculation module described herein in embodiments in which a generalized segmentation model is used to produce user-enrichable data, according to various embodiments.
Figure 10C:
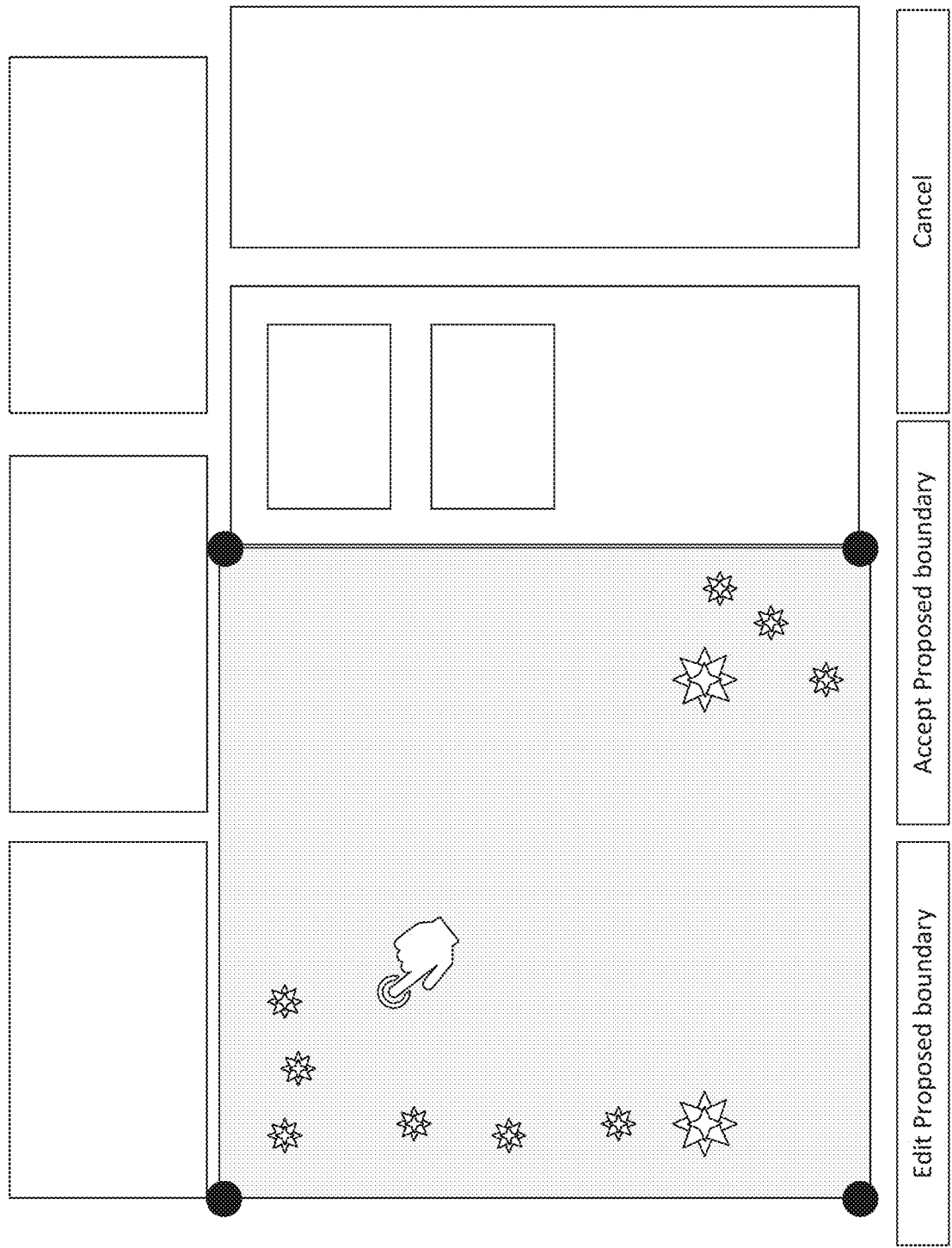

FIG. 9 illustrates a process that may be performed by any boundary calculation module described herein in embodiments in which a generalized segmentation model is used to produce user-enrichable data, according to various embodiments. FIGS. 10A, 10B, and 10C each schematically illustrate a different state of an example visualizations that may be displayed by any compute device processor described herein to perform the process described with reference to FIG. 9, according to various embodiments. Referring to FIG. 10A, a visualization of a selected location/property may be shown differently than visualizations of other nearby properties/buildings. Referring to FIG. 10B, the user may tap the selected visualization to display a boundary suggestion. Referring to FIG. 10C, the user may edit or accept the suggested boundary.

In any embodiment described herein, more than one autonomous operating zone may be generated for the same working machine. One of these autonomous operating zones may include a different boundary than another autonomous operating zone. Each autonomous operating zone may correspond to a different "mission" for the working machine. Different missions may be created for a same working machine for a same physical area on different days/times, for different lighting conditions, for different weather conditions, etc., and/or stored for later user. A user may define one of the missions as a currently active mission, and the working machine may utilize the autonomous operating zone for the currently active mission. In a simple example, a user may define a first mission having a first operating zone or safety boundary for a working machine to use during a particular time of day than a second missing having a second different operating zone or safety boundary (which may be applied outside the particular time of day).

In view of the many possible embodiments to which the principles of the disclosed technology may be applied, it should be recognized that the illustrated embodiments are only preferred examples and should not be taken as limiting the scope of the disclosure.

The invention claimed is:

1. An apparatus, comprising:
 a working machine to perform one or more work tasks in an autonomous operating zone, wherein the autonomous operating zone comprises one or more virtual boundaries for a section of a field, a property, or another physical area;
 wherein the working machine includes 1) a transportation system; 2) one or more tools to perform the one or more work tasks; 3) one or more actuators to operate one or more motorized devices of the transportation system or the one or more tools, and 4) a circuit configured to determine a current location within the section of the field, the property, or the other physical area; and
 the working machine further including a set of one or more processors to control the one or more actuators, the set of one or more processors to monitor the current location of the working machine relative to the one or more virtual boundaries using the circuit, and de-actuate at least one of the one or more motorized devices or the one or more tools, or vary an operation of the at least one of the one or more motorized devices or the one or more tools in response to the current location no longer coinciding with the autonomous operating zone;
 wherein the apparatus further comprises:
  a touchscreen or another user interface; and
  one or more processors coupled to the touchscreen or the other user interface, the one or more processors configured to:
   generate the autonomous operating zone based at least in part on recognizing features, including one or more features that are not indicated by publicly available property line data; and
   display the autonomous operating zone on the touchscreen or the other user interface.

2. The apparatus of claim 1, wherein the one or more processors are configured to:
 recognize the features in a map of the field, the property, or the other physical area;
 produce autonomously generated initial data at a pixel level based on information from the map, the autonomously generated initial data including a set of segmentation boundaries; and
 collect user-specified data via the touchscreen or the other user interface to enrich the autonomously generated initial data to produce subsequent data, in which the autonomous operating zone is set up based on the subsequent data.

3. The apparatus of claim 2, wherein the touchscreen or the other user interface:
 includes one or more visualizations of the map with the set of segmentation boundaries displayed thereon; and
 is arranged for the user to refine the set of segmentation boundaries by at least one of moving, adding, or subtracting a perimeter of a work area for the working machine using the one or more visualizations.

4. The apparatus of claim 2, wherein the autonomously generated initial data is generated using a generalized segmentation model operated by a cloud device, a server, or other remote resource.

5. The apparatus of claim 1, wherein the autonomous operating zone includes one or more speed zones.

6. The apparatus of claim 1, wherein the touchscreen or the other user interface is integrated with the working machine, and wherein the one or more processors coupled to the touchscreen or the other user interface comprise one or more processors of the set of one or more processors of the working machine.

7. The apparatus of claim 1, wherein the one or more processors coupled to the touchscreen or the other user interface are different than the one or more processors of the set, and the apparatus further comprises:
 one or more computing devices coupled to the working machine by a wired or wireless connection, the one or more computing devices including the touchscreen or the other user interface and the one or more processors coupled to the touchscreen or the other user interface, the one or more computing devices to transmit information about the autonomous operating zone over the wired or wireless connection to the set of one or more processors;
 wherein the monitoring by the set of one or more processors is initiated following receipt of the transmitted information.

8. The apparatus of claim 7, wherein the touchscreen or the other user interface and at least one of the one or more processors coupled thereto are part of a stationary device, and wherein the at least one processor of the stationary device is configured to download the information about the autonomous operating zone to a portable device to be coupled to the working machine via a wired or wireless connection.

9. The apparatus of claim 1, wherein the set of one or more processors or the processor coupled to the touchscreen or the other user interface are further configured to:
 translate user-specified locations on an image-based map to coordinate information;
 wherein the autonomous operating zone comprises the coordinate information, or is derived from the coordinate information.

10. The apparatus of claim 1, wherein the one or more processors coupled to the touchscreen or the other user interface are further configured to:
 present a user input interface alongside at least a portion of a map having a suggested boundary indicated on the portion of the map; wherein:
  the user input interface is to make modifications to the suggested boundary if the user does not accept the suggested boundary using the user input interface; and
  the autonomous operating zone is generated based on information about a location provided via the user input interface or determined based on a location of the working machine or a location corresponding to the operator.

11. The apparatus of claim 10, wherein the suggested boundary is draggable to make modifications to the suggested boundary.

12. The apparatus of claim 1, wherein the recognizing features comprises:
performing a pixel analysis on a map of the field, the property, or the other physical area.

13. The apparatus of claim 10, wherein the one or more processors coupled to the touchscreen or the other user interface are further configured to:
access 3D data of the field, the property, or the other physical area; and
perform boundary identification using the 3D data;
wherein the suggested boundary is based on the 3D data.

14. The apparatus of claim 1, wherein:
the set of one or more processors are further to store a plurality of autonomous operating zones for the same working machine;
each autonomous operating zone of the plurality of autonomous operating zones corresponds to a different mission from a plurality of different missions;
the set of one or more processors is to identify a currently active mission of the plurality of different missions; and
the monitoring of the current location of the working machine is based on one of the plurality of autonomous operating zones that corresponds to the currently active mission.

15. The apparatus of claim 1, wherein the recognized features are in the field, the property, or the other physical area.

16. The apparatus of claim 1, wherein the one or more processors coupled to the touchscreen or the other user interface are configured to display a map of the field, the property, or the other physical area, and to receive a user selection via a tap on the displayed map, wherein the user selection defines a center of an area of interest of the displayed map.

17. The apparatus of claim 2, wherein the user-specified data is to at least one of exclude or include individual segmentation boundaries of the set of segmentation boundaries.

* * * * *